Sept. 4, 1928.  
H. C. WASSON ET AL  
1,682,875  
CONTROL APPARATUS FOR OIL ENGINES  
Filed Aug. 11, 1924  
3 Sheets-Sheet 1
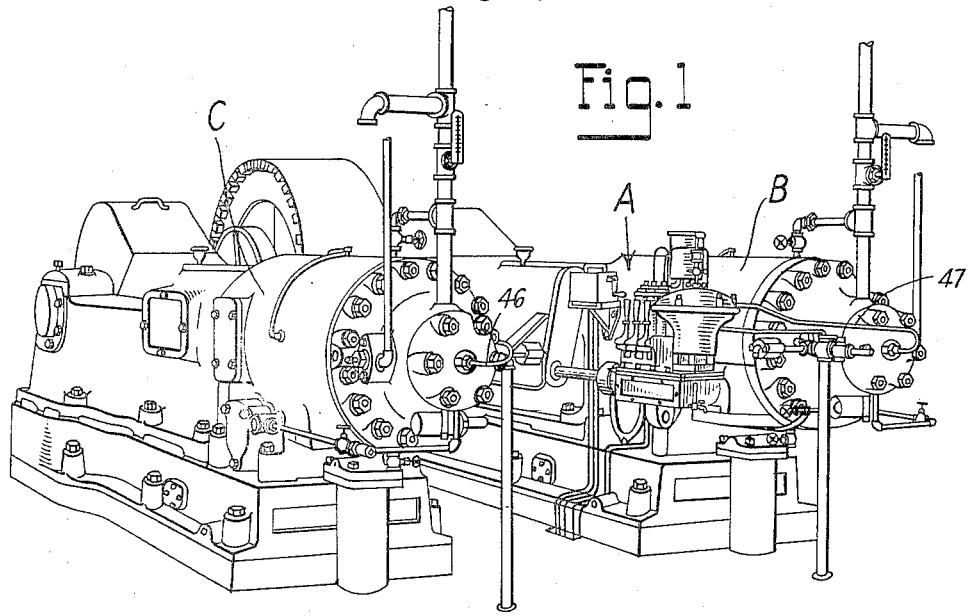
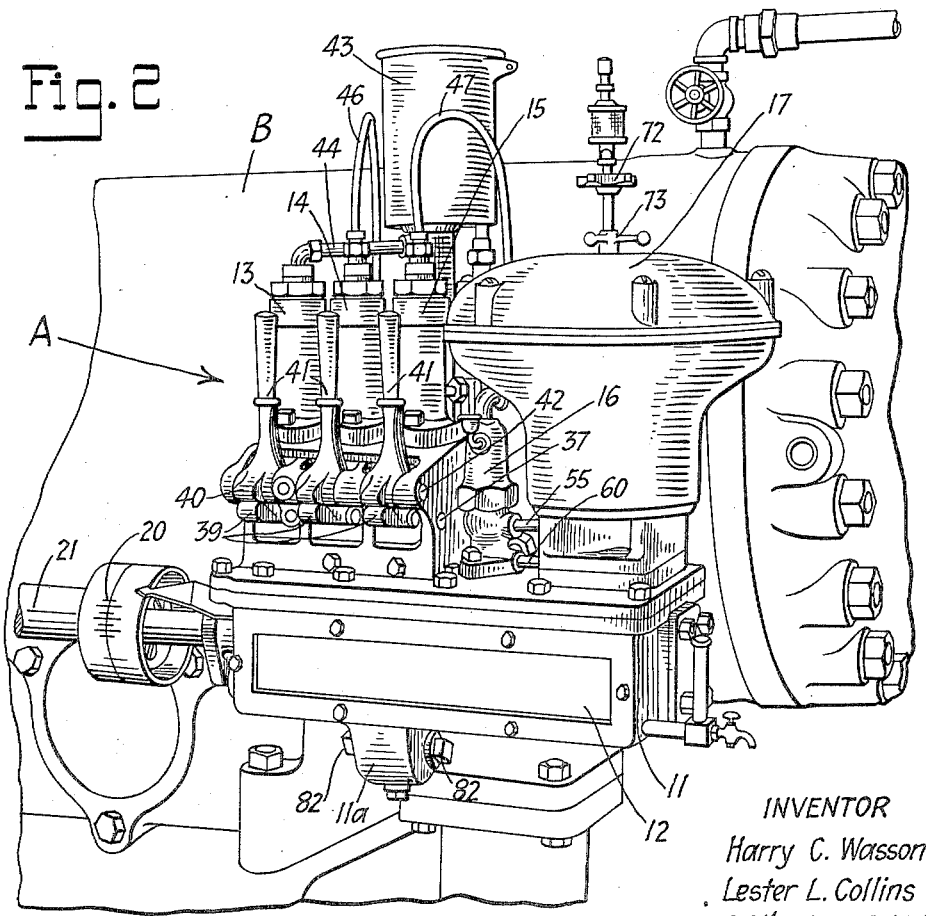
INVENTOR  
Harry C. Wasson  
Lester L. Collins  
BY their ATTORNEY  
Ira L. Nickerson

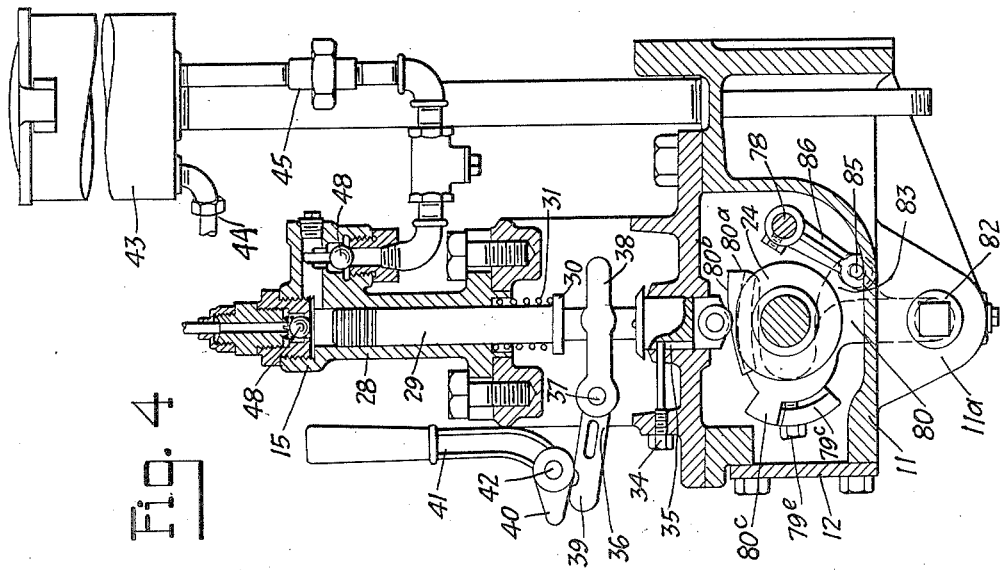
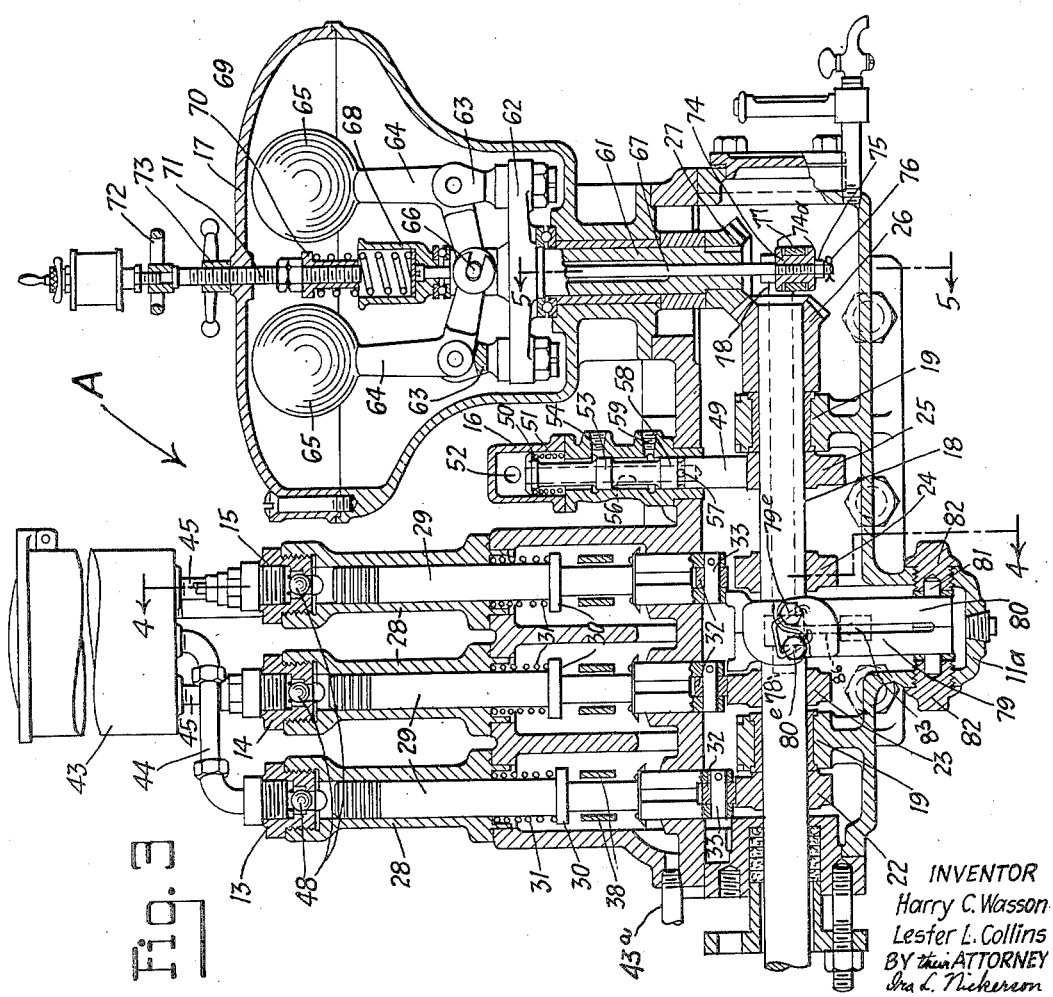

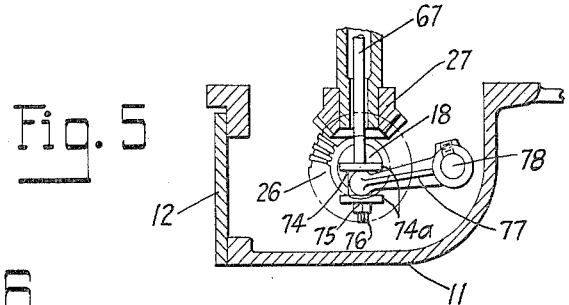
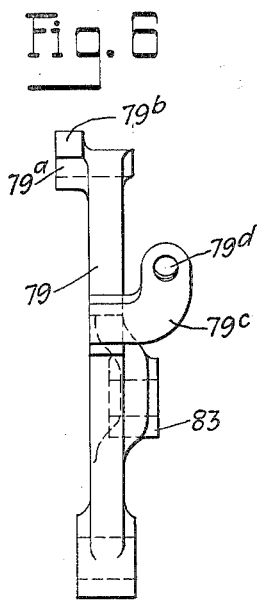
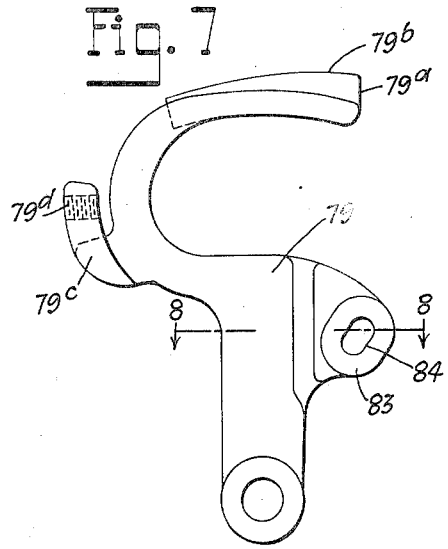
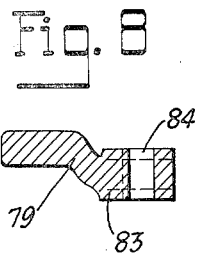
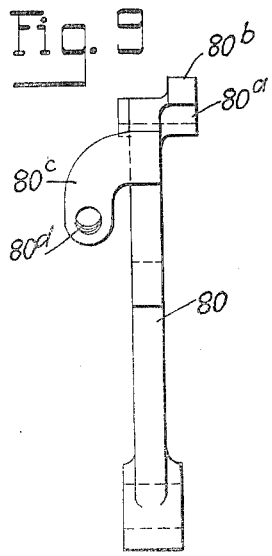
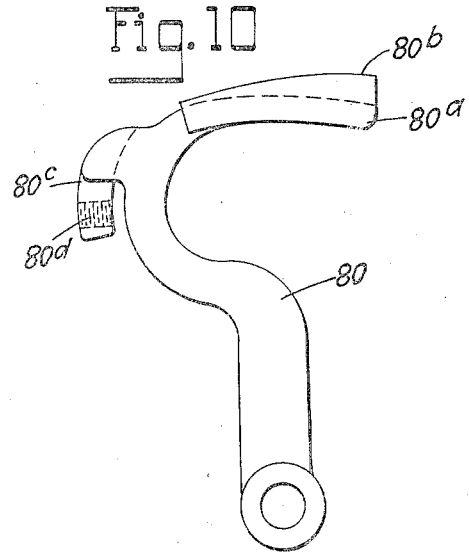
INVENTOR
Harry C. Wasson
Lester L. Collins
BY their ATTORNEY
Ira L. Nickerson Patented Sept. 4, 1928.

1,682,875

UNITED STATES PATENT OFFICE.

HARRY C. WASSON AND LESTER L. COLLINS, OF FRANKLIN, PENNSYLVANIA, ASSIGNORS TO CHICAGO PNEUMATIC TOOL COMPANY, OF NEW YORK, N. Y., A CORPORATION OF NEW JERSEY.

CONTROL APPARATUS FOR OIL ENGINES.

Application filed August 11, 1924. Serial No. 731,319.

This invention relates to apparatus for the automatic control of internal combustion engines of the type utilizing as fuel the heavier hydrocarbon oils such as crude petroleum and its heavier refined and semi-refined products.

Engines of the discribed type are intended to operate at a substantially uniform speed and to maintain uniform speed the fuel charge must be varied in proportion to variations in load. In the case of multi-cylinder engines, efficient operation requires a substantially equal power output from the cylinders. Accordingly the efficient control of a multicylinder engine of this type requires not only variations in the fuel supply to compensate for changes in load but also means for proportional adjustment of the fuel charge to the respective cylinders to secure a uniform flow of power.

Among the objects of the invention are to provide a single compact unit control assembly for engines of the type described, to establish automatic regulation of the fuel charge to the engine cylinders in response to the variations in the load on the engine, to provide manual adjustment of such automatic regulating apparatus to fix the ratio of the fuel charges to the cylinders in order that there may be a uniform power output, to effect the control of the air starting apparatus by a single movable control element, and in general to improve prior apparatus of the described type in the interest of more efficient, more economical, and more satisfactory service.

Heretofore it has been the practice to dispose the control devices for engines of this type at various positions on the engine and to drive the devices in different ways, often by long connections such as belts, rods, etc. which by reason of slippage, bends, lost motion, etc. tended to make the operation of the control devices erratic and unreliable. Further the wide separation of the devices and the absence of positive driving connections rendered the accurate setting of corelated adjustments difficult and time consuming.

The present invention contemplates the combining of all the control devices in a single assembly to be actuated by a single accurately timed shaft, preferably driven by spiral gearing to avoid lost motion. Cooperating adjustable connections conveniently disposed in close association and accessible at the same time to the operator make accurate adjustment of all the devices quick and easy of accomplishment.

In order to make clear the nature of the invention and the manner of its operation, one concrete embodiment thereof is shown in the accompanying drawings, in which:

Fig. 1 is a perspective view of a duplex oil engine equipped with the improved control apparatus;

Fig. 2 is an enlarged perspective view of that part of Fig. 1 which discloses the control apparatus;

Fig. 3 is a longitudinal sectional view of the control apparatus shown in Fig. 2;

Fig. 4 is a transverse sectional view substantially on the line 4—4 of Fig. 3;

Fig. 5 is a fragmentary sectional view on the line 5—5 of Fig. 3;

Figs. 6, 7 and 8 are respectively an end elevational view, a side elevational view, and a sectional view on a line 8—8 of Fig. 7 of one of the stop members; and Figs. 9 and 10 are respectively an end elevational view and a side elevational view of the other stop member.

The embodiment of the invention chosen for the purpose of illustration comprises a unit control assembly A for a two cylinder or duplex oil engine, the cylinders of which are indicated at B and C. Since the form or construction of the oil engine itself forms no part of the present invention, a detailed description of the same is omitted and attention is directed at once to the features of the control apparatus shown in Figs. 2 to 10 inclusive.

The control apparatus in the form of the unit assembly A is secured in any suitable or desired manner to any part of the engine; in the present instance it is shown secured to cylinder B. It includes a casing 11 provided with a removable face or inspection plate 12. Upon this casing are grouped the various devices necessary for the control of an engine of this character. At the left end of the casing is grouped a battery of pumps, specifically, the auxiliary fuel reservoir pump 13, injection pump 14 for cylinder C, and injection pump 15 for cylinder B. Adjacent the pumps is the compressed air starting control 16 and next upon casing 11 the speed governor 17. All these mechanisms are operated by a driving shaft 18 supported in suitable bearings 19 within casing 11, this shaft being driven through a suitable coupling 20 (Fig. 2) by a lay shaft 21 rotated by suitable gearing connections, preferably of the spiral type, (not shown), at the same speed as the main engine shaft. Driving shaft 18 within casing 11 has a series of cams 22, 23 and 24 for actuating the pumps 13, 14 and 15 respectively, a cam 25 for actuating the air starter device 16 and a bevelled gear 26 meshing with a similar bevelled gear 27 on the shaft of the speed governor 17 for operating the latter.

The pumps are preferably all of the same form although this is not essential and each comprises a cylinder 28 wherein reciprocates a piston 29, each piston having a flange 30 serving as one abutment for a spiral spring 31 arranged to maintain an anti-friction roller 32 mounted on a shaft 33 secured in the forked end of each piston rod in engagement with its respective operating cam 22, 23 or 24. To prevent the piston from turning and disposing the roller 32 transverse to its cam, each pump preferably has a bolt 34 (Fig. 4) threaded into the side of the pump casing and formed with a pin end which projects into a vertical slot 35 in the lower end of each piston or pump plunger 29. To render each one or all of the pumps inoperative whenever desired or to operate the same manually if desired, each is provided with manual control means consisting of a lever 36 pivotally mounted on shaft 37 fixed in the pump casing and having its forked end 38 in engaging with the piston or plunger stem beneath the flange 30, the other end 39 of the lever being arranged to be engaged by a beak or projection 40 on a manual control lever 41 pivoted on a shaft 42 secured in the pump casing. The manual control is made operative by swinging the handle 41 to a horizontal position whereupon beak 40 rests in a notch on one end of lever 36, the other or forked end of which engages flange 30 and lifts piston or plunger 29 to the upper limit of its movement and disposing its lower end beyond the reach of its operating cam.

Pump 13 operates to raise the fuel from the main tank (not shown) to an auxiliary tank 43 disposed in proximity to all three pumps, the discharge line of pump 13 being indicated at 44 (Figs. 2 and 3). An over flow arrangement in tank 43 returns fuel above a predetermined level to the main tank. Similarly a pipe 43ª drains the pump casing of the fuel oil which works past the pump pistons 29, conveying the same back to the main tank. The fuel injection pumps 14 and 15 on the down stroke of their pump plungers draw the fuel charge directly from auxiliary tank 43 through connections 45 and discharge into lines 46 and 47 which lead to injection nozzles in the heads of cylinders C and B respectively. Check valves 48 preferably of the ball type are provided wherever necessary in all the pump connections.

The air starter control 16 operated by cam 25 on shaft 18 comprises a piston or plunger 49 arranged to reciprocate in a suitable casing. The piston has a flanged head 50 loosely received in the cap portion of the casing and yieldingly engaged by a coil spring 51 to maintain piston 49 normally out of contact with its cam 25. When the air control is thrown into operation by opening the air valve, motive fluid enters the cap of the casing through port 52 and forces the piston 49 against the resistance of spring 51 into contact with the cam 25. When the piston is in its lowest position, as shown in Fig. 3, the flange 53 thereon, which makes an air tight fit with the casing, is moved to a position to permit the motive fluid to pass out through a port 54 in the casing and through a pipe connection 55 (Fig. 2) to operate the air inlet valve on cylinder B. Piston 49 also has an axial bore 56 open at its upper end and a ring of radial ports 57 communicating with the bore below a second flange 58, the ports 57 being arranged to register with a port 59 in the casing when the piston is at the upper limit of its movement. From port 59 a conduit 60 (Fig. 2) leads to the air inlet valve on cylinder C.

The speed governor 17 driven by the bevelled pinion 26 on the drive shaft 18 may be of any suitable or desired type. The governor shown has a main shaft 61 mounted in suitable bearings in the governor casing and to the end of which the bevelled gear 27 is secured to mesh with gear 26. The head 62 on shaft 61 carries posts 63 on which are pivoted the bell cranks 64, to the outer ends of which are secured or integrally formed the fly balls 65. The inner ends of the ball cranks 64 are slotted or forked to engage a transverse pin 66 on a shaft 67 which extends axially through a central bore in the main shaft 61. The upper end of shaft 67 carries a cup-shaped member 68 which serves as a socket for a coil spring 69 engaging a flange 70 on an adjusting screw 71 threaded into the governor casing, adjustment of which is provided for by handle 72 fixed thereon. This screw 71 adjusts the tension or pressure of spring 69 whereby the speed at which the governor operates is controlled, a locking nut 73 serving to lock screw 71 in adjusted position. The lower end of reciprocatory shaft 67 has a nut 74 threaded thereon and secured in adjusted position by a lock nut 75 and cotter pin 76. Nut 74 has end flanges 74ª defining a circumferential groove in which is received the forked end of a lever 77 (Fig. 5) secured to a shaft 78 disposed in parallelism with drive shaft 18 and mounted for rocking movement in suitable bearings within casing 11 in response to the reciprocatory movement of shaft 67. This rock shaft 78 actuates the stop mechanism for the fuel injecting pumps 14 and 15 which will now be described.

The fuel pump stop mechanism disclosed in assembled and operative relation in Figs. 3 and 4 and in its essential features in the detailed views of Figs. 6 to 10 inclusive comprises substantially hooked shaped members 79 and 80 pivotally mounted at their lower ends on a stub shaft 81 supported in socket members 82 threaded into openings therefore in a downward projection or extension 11$^a$ of casing 11 (Figs. 2, 3 and 4). Shaft 81 is disposed beneath drive shaft 18 so that the latter is received in the loop portion of the hook shaped stop members 79 and 80, as clearly indicated in Fig. 4 so that the bill or hooked end portions thereof are disposed in proximity to and below the plungers of pumps 14 and 15. The bill portion of each stop member has an offset portion 79$^a$ or 80$^a$ disposed beneath its respective pump plunger to engage the fixed portion thereof adjacent its roller 32 without interfering with the operation of the driving cams 23 and 24 respectively. These offset portions have inclined or cam surfaces 79$^b$ and 80$^b$ respectively for engagement with their respective pump plungers thereby forming adjustable stops or actuating surfaces independent of cams 23 and 24. Stop members 79 and 80 are arranged to be locked together for movement in unison by mechanism presently to be described and one of the members, in the present instance 79, has a projection 83 offset to partly align with both the stop members 79 and 80. This projection has a slot 84 in which a pin 85 on arm 86 secured to the other end of rock shaft 78 is received. By this arrangement the actuation of shaft 67 by the fly ball governor when the predetermined speed is exceeded rocks the shaft 78 which in turn swings the interlock stop members 79 and 80 on their pivot 81 to the left (Fig. 4) whereby the inclined or cam surfaces 79$^b$ and 80$^b$ engage the ends of plungers 29 of the fuel injection pumps 14 and 15 respectively and raise the latter partly or wholly beyond the reach of their actuating cams 23 and 24 to reduce or entirely cut off the fuel charge to the pistons C and B to reduce the speed of the engine.

The interlocking means for stop members 79 and 80 above referred to forms an important feature of the present invention in that it provides an easy and convenient method of proportioning the fuel charges to the respective cylinders to secure an equal output of power from both. This locking mechanism may take the form of interengaged offset projections 79$^c$ and 80$^c$ respectively. Projections 79$^c$ (Fig. 6) extends to the right from the lower portion of the loop of member 79 and then bends upwardly in the plane of member 80 when the two stop members are in juxtaposition. In a similar manner projection 80$^c$ (Fig. 9) extends from the upper portion of the loop of stop member 80 to the left and downwardly into the plane of member 79 when the two stop members are juxtaposed. Offset projections 79$^c$ and 80$^c$ have threaded openings 79$^d$ and 80$^d$ receiving screw bolts 79$^e$ and 80$^e$ (Fig. 3), the screw bolts on one member engaging the loop portion of the other member so that by the adjustment of both screw bolts 79$^e$ and 80$^e$, the relative angular disposition of the two stop members 79 and 80 may be fixed. Thus stop members 79 and 80 may be arranged in exact register with each other or out of line, either one or the other being in advance, the slot 84 in the projection 83 on member 79 permitting such adjustment without affecting the connection with the rock shaft 78 and the automatic speed control. Thus, if either cylinder requires a slightly greater or slightly smaller fuel charge to produce the same power impulse as the other, the interlocking arrangement just described provides for this without interfering with the automatic control. As the fuel discharge pipe 46 from pump 14 leading to cylinder C is much longer than the fuel discharge pipe 47 from pump 15 leading to cylinder B, the adjustable locking arrangement permits giving the piston 29 of pump 14 a slight lead over pump 15 to compensate for the added resistance which may be due to inertia and friction induced in the longer connection. In case the condition just described results in a substantial difference in the setting of the inclined stop surfaces of members 79 and 80, the invention contemplates such differences in the inclination of the cam surfaces 79$^b$ and 80$^b$ as will result in a substantially proportional reduction in the fuel charge to both cylinders of the engine when the rock shaft 78 is actuated by the speed governor to reduce the fuel supply of both cylinders.

From the above it will be apparent that the grouping of the control elements of a multicylinder oil engine, heretofore arranged on different parts of the same and with different driving connections, in a compact unit assembly with a single drive shaft adds greatly to the ease of adjustment of the individual control elements and increases the efficiency and coaction of the latter by eliminating lost motion and irregularities in driving ratio, that through the interconnection of the speed control apparatus with the fuel injection pumps herein described, positive and immediate reduction of the fuel charge is accomplished when the speed governor is operated, that the assembly of these parts in and upon a single control casing eliminates danger of accidental breaks in connections and insures positive interaction and coaction, that the herein described arrangement for relative adjustment of the stop members permits setting the same to secure an equal delivery of power from the cylinders of a multi-cylinder engine of the described type, that the interlocked relatively adjustable stop members with their properly proportioned engaging surfaces provide simple and efficient means applicable to varied types of control apparatus to secure results such as herein described, and that the air starter control arrangement provides simple, positive and efficient means for this purpose.

While but a single embodiment of the invention has been herein shown and described, it is obvious that with slight changes and modifications, the invention is readily applicable to oil engines having a single cylinder or more than two cylinders. Hence it is to be understood that the invention is not limited to the specific details of construction and arrangement herein shown but covers adaptations and modifications within the scope of the appended claims.

We claim as our invention:

1. A unit control assembly for a multi-cylinder oil engine comprising a casing, a speed governor and fuel injecting pumps mounted on said casing, reciprocating pistons in said pumps, a driving shaft within said casing for said governor and pumps, means controlled by said governor for uniformly varying the fuel charges of said pumps, and means positively limiting the stroke of said pistons and permitting relative variation of the same to secure an equal power output from the cylinders of the engine.

2. A unit control assembly for a multi-cylinder oil engine comprising a casing, a speed governor and fuel injecting pumps mounted on said casing, reciprocating pistons in said pumps, a driving shaft within said casing for said governor and pumps, movable stop members for limiting the movement of said pistons in the charge determining directions, means actuating said members from said governor, and means permitting relative adjustment of said members to secure a uniform power output from the engine.

3. A unit control assembly for a duplex oil engine comprising a casing, a speed governor and fuel injecting pumps for each cylinder on said casing, a driving shaft for said governor within said casing, cams on said shaft for actuating the plungers of said pumps, stop members pivotally mounted adjacent said shaft having cam surfaces arranged to intercept said pump plungers to vary the throw thereof by the cams on said shaft, a rock shaft within said casing under control of said governor for automatically adjusting said stop members in response to variations in the load on said engine, and means for varying the relative positions of said stop members to secure an equal power output from both cylinders of the engine.

4. Control mechanism for a duplex oil engine comprising juxtaposed fuel injecting pumps, a driving shaft having cams for intermittently actuating the plungers of said pumps, members pivotally mounted adjacent said shaft and presenting inclined stop surfaces to engage said plungers for limiting the throw thereof by said cams, said members being relatively adjustable to permit a setting thereof which will give an equal power output from both cylinders of the engine, and speed responsive means for moving said members in unison on their pivots to vary proportionately the throw of the pump plungers and the fuel charges delivered thereby in response to variations in the load on the engine.

5. Control apparatus for effecting relative adjustment of two plungers and for proportional movement of the plungers when adjusted, comprising two juxtaposed members mounted for rocking movement on the same pivot, one member engaging one of said plungers and the other member the other plunger, and means for fixing the relative angular position of said members while permitting rocking movement of the same in unison on said pivot, said members having inclined surfaces for engagement with said plungers.

6. Control apparatus for effecting relative adjustment of two plungers and for proportional movement of the plungers when adjusted comprising two juxtaposed members mounted for rocking movement on the same pivot, one member engaging one of said plungers and the other member the other plunger, and interengaging parts on said members disposing the same for rocking movement in unison on said pivot and providing for adjustment of the relative angularity of said members, said members having cam surfaces for engagement with said plungers.

7. Control apparatus for effecting relative adjustment of two plungers and for proportional movement of the plungers when adjusted comprising members mounted in parallelism on the same pivot, said members having offset parts, each part intersecting the plane of the other member, an adjusting screw on each part engaging the other member thereby adjustably to fix the relative angular position of said members and to secure said members for rocking movement in unison on said pivot, said members having cam surfaces for engagement with said plungers.

8. In combination, in control apparatus, two plungers, means for intermittently reciprocating said plungers, and members pivotally mounted for rocking movement in the same direction in unison, said members having portions arranged to engage said plungers to change the position of the latter relative to said means, said members being adjustable relative to each other and to said plungers.

9. In combination, in control apparatus, two plungers, a shaft having cams engaging said plungers to actuate the same, and members pivotally mounted for rocking movement in unison, said members having portions arranged to engage said plungers independently of said cams to change the position of the plungers relative to said cams, said members being adjustable relative to each other and to said plungers.

10. In combination, in control apparatus, two plungers, a shaft having cams for actuating said plungers, and hook-shaped members pivotally mounted for rocking movement in unison, receiving said shaft within the loop portions of their hook ends, said members having offset portions arranged to engage said plungers independently of said cams to change the position of the plungers relative to said cams, said members being adjustable relative to each other and to said plungers.

11. In combination, in control apparatus, two plungers, a shaft having cams for actuating said plungers, hook-shaped members mounted in parallel juxtaposition on the same pivot and receiving said shaft within the loop portions of their hook ends, offset projections having inclined surfaces to engage said plungers independently of said cams adjustably to fix the position of the plungers relative to said cams, said members having offset parts, each part intersecting the plane of the other member, an adjusting screw on each part engaging the other member thereby adjustably to fix the relative angular position of said members and to secure said members for rocking movement in unison on said pivot, said members having cam surfaces for engagement with said plungers.

12. In control apparatus for a duplex oil engine having fuel injecting pumps and a speed governor, means including a shaft rotated in fixed relation to the speed of the engine for moving the pump plungers in one direction, springs for moving the pump plungers in the reverse direction, and mechanism actuated by said governor when the speed of the engine exceeds a predetermined rate for modifying the operation of said pumps, said mechanism including a pair of mutually adjustable stop members mounted for pivotal movement about the same axis and each engaged by one of said pump plungers.

Signed by us at Franklin, Pennsylvania, this 4th day of August, 1924.

HARRY C. WASSON.
LESTER L. COLLINS.